March 2, 1948.  C. B. MOORE  2,436,971
MEASURING INSTRUMENT CHART PLATE SUPPORT
Original Filed Dec. 9, 1939  2 Sheets-Sheet 1
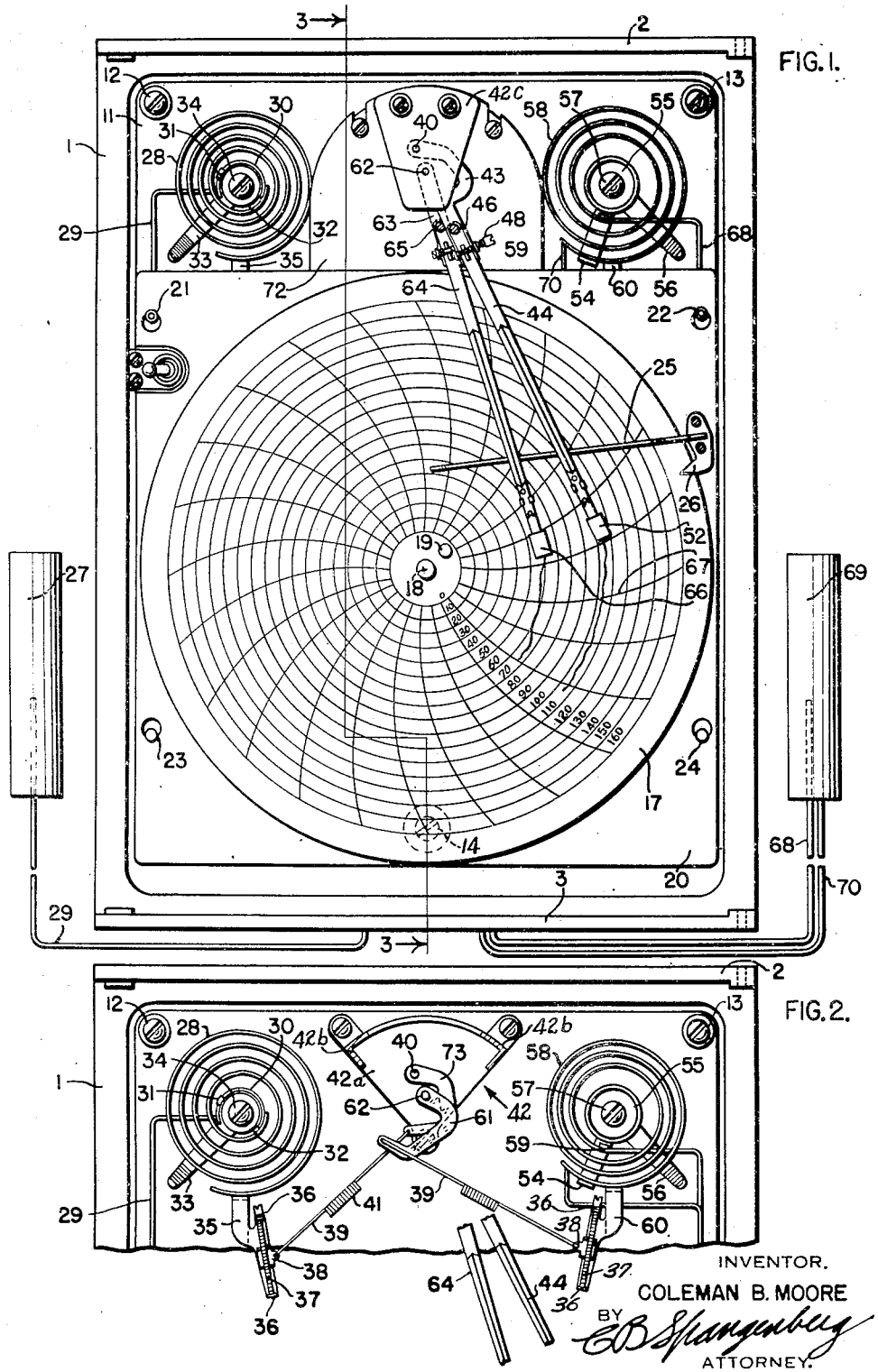
INVENTOR.
COLEMAN B. MOORE
BY
C.B. Spangenberg
ATTORNEY.

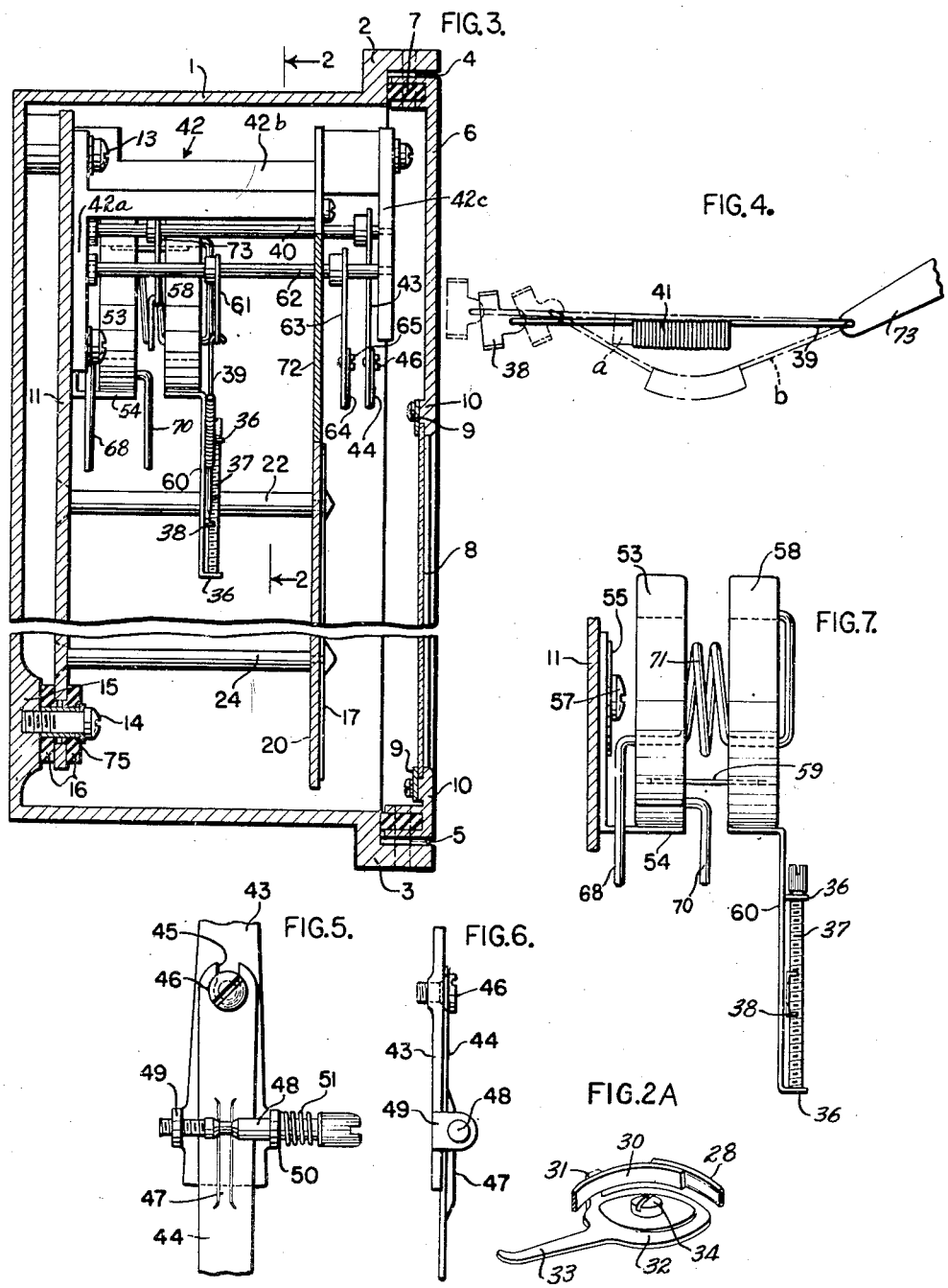

Patented Mar. 2, 1948

2,436,971

UNITED STATES PATENT OFFICE 2,436,971

MEASURING INSTRUMENT CHART PLATE SUPPORT

Coleman B. Moore, Carroll Park, Pa., assignor to The Brown Instrument Company, Philadelphia, Pa., a corporation of Pennsylvania Original application December 9, 1939, Serial No. 308,434. Divided and this application March 4, 1944, Serial No. 525,002

4 Claims. (Cl. 234—75)

The present invention relates to industrial thermometers and more particularly to those in which the temperature responsive element is located at a distance from the recording and/or controlling mechanism. The present application is a division of my copending application for improvements in Measuring instruments, Serial Number 308,434, filed December 9, 1939, now Patent 2,359,141, granted September 26, 1944.

It is an object of the present invention to provide a recording thermometer which is accurate and one in which the accuracy will be maintained under conditions of rough treatment.

It is a further object of the invention to provide an improved means for mounting a backing plate for the chart.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a front view of the instrument with the door removed;

Fig. 2 is a view on line 2—2 of Fig. 3;

Fig. 2A is a view showing the mounting for a temperature responsive element;

Fig. 3 is a view on line 3—3 of Fig. 1;

Fig. 4 is a view of the connecting link;

Fig. 5 is an enlarged front view of the pen arm supporting and adjusting mechanism;

Fig. 6 is a view looking from the left in Fig. 5; and

Fig. 7 is a side view of the double spiral arrangement.

Referring first to Fig. 1 there is shown a casing 1 of rectangular shape which is open at the front and is provided with ledges 2 and 3 at the top and bottom of the opening. Pins 4 and 5 are driven through corners of these ledges to support a door 6 which serves to close the casing and which is provided with a gasket 7 that serves, when the door is closed, to make the casing dust tight and moisture tight. This door is provided with a window 8 through which may be seen the chart and the pens by which the values of the temperatures being measured are recorded on the chart. The window is held in position by means of clips 9 that are fastened to a flange 10 on the inner surface of the door.

Resiliently mounted within and attached to the back of the casing 1 is a sub-plate 11 upon which the recording mechanism is mounted. The plate 11 is attached to the casing at three points, 12 and 13 and a third point, the latter of which is shown in Fig. 3 and is at the bottom of the plate and midway between vertical lines drawn from points 12 and 13. Each of the points of attachment is made by a screw such as 14 (Fig. 3) which extends through a hole in the plate 11 and is threaded into a boss 15 projecting from the surface of the casing. On each side of the plate 11 is a heavy washer 16 of resilient material that is placed under a predetermined tension which is regulated by the length of a sleeve 75 surrounding the screw 14. With this construction the plate 11 may move slightly relative to the casing when the latter is subjected to vibration. Also if the casing is slightly warped, when, for example, it is rigidly mounted against a surface that is not quite flat the washers 16 will give so that the plate 11 will remain flat and will therefore prevent a misalignment of the elements mounted thereon.

A chart 17 is provided upon which a record of the temperature measured may be made. This chart is provided with openings through which a pin 18 for centering the chart and a pin 19 for driving the chart may extend. The chart centering and driving pins rotate the chart and in turn are rotated by some suitable clock mechanism of any conventional type (not shown) at any desired rate, preferably once every twenty-four hours. In order to back up the chart while a record is being made there is provided a plate 20 that is supported on four posts 21, 22, 23 and 24. The two upper posts 21 and 22 are rigid and are fastened to the plate 11 and extend forwardly therefrom. Each of these posts is provided with an enlarged head and a reduced neck that is received in openings provided in the plate 20. The two lower posts 23 and 24 are each rigidly attached to the plate 11 and at least one, but preferably both, is made from a stiff but resilient material. In mounting the plate 20 in position the upper openings are placed over the posts 21 and 22 and the lower end of the plate is then pushed toward the posts 23 and 24. These latter posts will give enough so that the heads provided on their ends will move through openings in the lower part of the plate. The ends of the posts 23 and 24 will then move downwardly to hold the plate in the necks provided just back of the heads. In order to remove the plate 20 it is only necessary to force the outer ends of posts 23 and 24 upwardly so that the plate can be moved outwardly therefrom, then lift the plate from pins 21 and 22.

Attached to the chart plate 20 is a pen lifting device 25 that is used to raise the pens from the chart while it is being changed. Forming part of the bracket for the pen lifter is a pointer 26 that is used to help the attendant set the chart properly for the time of day at which the chart is started.

The actuating elements of the present invention are mounted on the sub-plate 11 in a novel manner and are connected to the pen by a connecting link which forms the subject matter of Ullman et al., Patent 2,307,248, granted January 5, 1943. There is shown in Fig. 1 the general relation of the various parts to each other, and more specifically in Figs. 2 and 3 the manner in which they are constructed. The measuring system as a whole comprises a bulb 27 filled with some type of temperature sensitive fluid, depending upon the use and range of the instrument, that is connected to a spiral Bourdon tube 28 by means of a capillary tube 29. The bulb 27 is placed at the point the temperature of which is to be measured and the spiral is mounted on the plate 11. Attached to the inner end of the spiral tube 28 is a bimetallic element 30 that in shape forms a continuation of the tube. A bracket 31 is fastened at one end to the element 30 and at its other end to a support 32 having an arm 33 extending outwardly therefrom (see Fig. 2A). This support is attached by a screw 34 to the plate 11. In adjusting the instrument the screw 34 is loosened and the arm 33 is grasped to rotate the spiral to its proper position, after which the screw is tightened to hold the spiral rigidly in place.

The capillary tube 29 connects to the inner end of spiral 28 and upon expansion or contraction of the fluid in the system due to changes in the temperature to which the bulb 27 is exposed, the outer end of the spiral will be moved counter-clockwise or clockwise, respectively. The capillary tube 29 is flexible enough so that it will not interfere with the movement of spiral 28 by the bimetallic element 30, or the capillary may be formed with a coil just before its point of attachment to the spiral. Moved by the end of the spiral is a bracket 35 that is attached thereto in any suitable manner. This bracket is provided with wings 36 in which a screw adjusting member 37 is journaled. A U-shaped slider member 38 is provided with ends that engage the threads of the screw 37 and may be moved along the bracket 35 for calibration purposes. The further the slider 38 is from the center of the spiral 28 the larger arc it will be moved through for a given deflection of the spiral. Therefore the position of the slider determines the amount of pen movement for a given temperature change.

A connecting link 39, shown best in Fig. 4, is attached at one end to the slider 38 and at its other end to an arm 73 attached to a pivoted shaft 40. The link 39 is formed of a continuous length of spring wire and has formed between its ends a helical spring section 41 that is wound with initial tension so that under normal conditions this spring section will have no action of its own. The link 39 also acts as a safety device or over-load release since, as shown diagrammatically in dotted lines in Fig. 4, if the pen is held stationary as the actuating element moves clockwise the spring section 41 will expand as shown at $a$. If on the other hand the actuating element rotates counter-clockwise the spring section will bend as shown at $b$. This type of connecting link is of great value since it provides protection for the pen upon excessive movement of the spiral and protection for the spiral upon accidental movement of the pen with an absolute minimum of parts.

The shaft 40 upon which the arm 73 is mounted is journaled at each end in a yoke shaped member 42 that is secured to the front of plate 11. This member has a back portion 42a attached to plate 11, forwardly extending bars 42b and a front portion 42c and serves to support in its portions 42a and 42c the shaft 40. This forms a very rigid support for the shaft with a corresponding accuracy of movement of the pen. A second arm 43 is attached to the shaft 40 and supports on its lower end the pen arm 44 and the pen 52. It should be noted that both arm 73 and arm 43 are curved in such a manner that for zero position of the pen 52 the arms will not be obstructed in their movement by a second shaft that is used to support a second pen and pen arm, to be described below. A shield 72 is attached to and near the front of yoke 42 directly above plate 20 to hide the connecting links.

The pen arm 44 is provided at its upper end with a slot 45 that is slightly enlarged in its inner end. This slot is received by a screw 46 that is threaded into the arm 43, the screw being provided with a conical head that fits into the enlarged portion of the slot 45. The connection between slot 45 and screw 46 forms a pivot point around which the pen arm may be given minute adjustments to correct it for its zero position. This adjustment is obtained by means of a raised portion in the shape of a rib 47 on the pen arm that is received by a neck formed in a screw member 48 which is journaled in wings 49 and 50 on the arm 43. The screw has a threaded connection with wing 49 and as it is rotated its neck portion will move the pen arm around its pivot formed by screw 46. A spring 51 is provided to take up any play between the threaded connection and to prevent accidental rotation of the screw 48.

With this type of connection the screw 46 may be loosened and the pen arm 44 moved downwardly to remove it when the pen is to be cleaned. Upon replacement of the pen arm it will be returned exactly to its original position by the camming action of the conical head of screw 46 as the screw is tightened. A pen 52 of any suitable type is attached to the lower end of the pen arm in order to make a record of the temperature of bulb 27 on the chart 17.

From the above description it will be seen that as the temperature to which bulb 27 is subjected changes, the pressure in the system, consisting of the bulb 27, capillary 29 and spiral 28, will change correspondingly. Upon an increase in temperature the spiral will tend to unwind to move bracket 35 in a counter-clockwise direction and through link 39 will move the arms 73 and 43 with shaft 40 in a counter-clockwise direction to move the pen 52 outwardly along the scale on chart 17. As the temperature of the case 1 changes the bimetallic member 30 to which the inner end of the spiral is attached will tend to move the spiral either clockwise or counter-clockwise depending upon the direction of temperature change. If the temperature of the case is lowered with respect to the temperature of the bulb the spiral 28 will tend to wind up and move arm 35 in a clockwise direction but the bimetallic element 30 is so formed that for the same temperature change it will tend to straighten out and to move the entire spiral counter-clockwise an equal amount. In this manner changes in the ambient temperature to which the casing is subjected are compensated for in such a manner that the pen will be positioned on the chart in exact accordance with the temperature to which the bulb 27 is subjected and there will be no erroneous reading due to changes in the case temperature.

Because of the adjustment provided for the spiral, the link 39 and the pen arm 44, the instrument can be so calibrated that it will read accurately for various ranges of temperature through which the bulb 27 is to be subjected and may also be adjusted to give an accurate reading in spite of various small production tolerances that may occur in the different parts making up the recording system.

Located at the right of the instrument casing 1 is a second measuring system that differs from the one just described in the type of compensation that is used to prevent an incorrect record being made due to changes in ambient temperature. The bimetallic element 30 in the system just described provides what is known as "case-compensation" and is used where the length of capillary tubing between the bulb and spiral is fairly short. Where the length of capillary tubing is long temperature changes along the tubing may cause errors in the record made. To compensate for such inaccuracies a double spiral arrangement that will give "capillary compensation" is used. This system will now be described.

A spiral Bourdon tube 53 is attached at its outer end to a bracket 54 that is in turn attached to a support 55 having an arm 56. The support is mounted on the sub-plate 11 by a screw 57 in a manner similar to that in which the support 32 is mounted thereon. Therefore as the spiral 53 winds and unwinds its inner end will move counter-clockwise and clockwise in Fig. 2. A second spiral Bourdon tube 58, identical to the spiral 53, is mounted for movement with the inner end of the spiral 53 by having a rigid connecting piece 59 attached to the inner end of each of the spirals. The outer end of spiral 58 has a bracket 60, similar in general construction to bracket 35, attached to its outer end. This bracket is formed with connecting parts similar to those on bracket 35 and is connected by a second link 39 to the outer end of an arm 61 that is attached to a shaft 62, that is also journaled in the yoke 42. An arm 63, to which is attached a pen arm 64 by means of a screw 65, is also fastened to the shaft 62 for movement therewith. Every movement of the outer end of spiral 58 will therefore move the pen arm 64 so that a pen 66 attached to the lower end thereof will make a record on the chart 17. The pen arm 64 has the same adjustments with respect to arm 63 that pen arm 44 has with respect to arm 43.

It should be noted that the shafts 40 and 62 are so located that a line drawn through their centers will pass through the point of the chart engaged by the writing tip of pen 66 when the latter is midway between its zero and full scale position. The time lines 67 on the chart are drawn as the arc of a circle around shaft 62 and have a radius equal to the distance from the center of shaft 62 to the writing tip of pen 66. Because of this arrangement the pens will accurately record the value of the temperature being measured on a scale concentric with the chart and the time that the record was made by pen 66 will be shown. In multiple pen instruments the writing tips of the pens are placed close together so that the time that a certain temperature is recorded on the chart by pen 66 will be displaced with respect to a record made at the same time by pen 52 by only a small amount. This is, however, relatively unimportant when compared with the accuracy with which the pens are adjusted across the value lines on the chart.

The spiral 58 is known as the measuring spiral and is connected by a capillary tube 68 with the interior of a temperature sensitive bulb 69. Therefore any changes in temperature to which the bulb 69 is subjected will cause expansion or contraction of the spiral 58. The spiral 53 is known as a compensating spiral and is connected to a capillary tube 70 which runs parallel to tube 68, but is closed off at the bulb 69. Therefore ambient temperature changes that occur along the capillary tubes and in the casing cause expansion and contraction of the spiral 53.

In the operation of this type of measuring system a change in temperature along the capillary tubes will cause the inner end of spiral 53 to move and, because of connection 59, the spiral 58 will be bodily moved therewith. The same change in temperature will cause the outer end of spiral 58 to move an equal amount, but in an opposite direction so that the net effect is to keep bracket 60 stationary. Looking at Fig. 2 it will be seen that this is true since upon an increase in temperature the inner end of the lower spiral 53 will move in a clockwise direction carrying the upper spiral 58 clockwise with it. The same temperature increase will cause the outer end of the upper spiral 58 to move an equal distance in a counter-clockwise direction so that in effect bracket 60 does not move. Any change in the temperature of the bulb 69, however, will only affect the spiral 58 so that movement of the bracket 60 is a true measurement of the temperature of the bulb 69. Since the spiral 58 is bodily moved the capillary 68 leading thereto has a coil 71 of sufficient length formed in it to prevent any bending forces that may be set up in it from having any effect on the movement of the spiral 58.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring instrument having a recording mechanism adapted to make a record of the value of a condition being measured on a chart and means to support the chart, the combination of a plate to back up said chart, said plate having a plurality of openings therein, means to support said plate in position comprising a pair of rigid posts each having a reduced portion formed thereon to receive one of said openings and resilient posts each having a reduced portion thereon to receive another of said openings, the resilient posts acting to maintain each of said reduced portions tightly in the opening received thereby.

2. In a measuring instrument having a casing and a supporting plate mounted in said casing, the combination of a chart plate mounted in front of said supporting plate, openings in said chart plate, a pair of posts rigidly mounted on said supporting plate and each having a reduced portion received by an opening in said charge plate, a second pair of posts mounted on said supporting plate, each post having a reduced portion received by an opening in said chart plate, one of the pairs of posts being resilient and under tension when these posts are in their openings whereby they force the reduced portions thereof tightly into said openings.

3. In a measuring instrument having a casing with an open front and having an actuating element connected to a recording element, the combination of means to support a chart upon which a record is to be made comprising a plate having openings therein and stationary posts projecting through the openings in said plate, at least one of said posts being of resilient material, and under tension when it is projecting through the plate whereby it will hold said plate tightly against the remaining posts.

4. In a measuring instrument having a casing having in it a supporting plate upon which is mounted an actuating element that in turn operates a recording element which is pivoted from the plate, the combination of a backing plate for a chart upon which a record is to be made by the recording element, said backing plate being provided with a plurality of openings, and means to mount said backing plate on the supporting plate comprising a pair of rigid posts and a pair of resilient posts received by said openings, said resilient posts being under tension to keep each of said posts in engagement with a side of the opening that received it.

COLEMAN B. MOORE.

REFERENCES CITED

The following references are of record in the file of this patent:

UNITED STATES PATENTS

| Number | Name | Date |
| --- | --- | --- |
| 1,136,648 | Bristol | Apr. 20, 1915 |
| 1,503,353 | Dugon | July 29, 1924 |
| 2,256,804 | Hurley | Sept. 23, 1941 |
| 2,338,323 | Fink | Jan. 4, 1944 |
| 588,631 | Brown | Aug. 24, 1897 |
| 2,044,049 | Bradley | June 16, 1936 |

FOREIGN PATENTS

| Number | Country | Date |
| --- | --- | --- |
| 128,793 | England | July 3, 1919 |
| 460,925 | England | Feb. 8, 1937 |